(12) United States Patent
Tsirkin

(10) Patent No.: US 12,259,824 B2
(45) Date of Patent: Mar. 25, 2025

(54) ASSIGNING INPUT/OUTPUT VIRTUAL ADDRESSES USING A PRE-DEFINED RANDOMNESS ALGORITHM

(71) Applicant: RED HAT, INC., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/973,839

(22) Filed: Oct. 26, 2022

(65) Prior Publication Data

US 2024/0143514 A1  May 2, 2024

(51) Int. Cl.
*G06F 12/1045* (2016.01)
*G06F 12/1036* (2016.01)

(52) U.S. Cl.
CPC ...... *G06F 12/1054* (2013.01); *G06F 12/1036* (2013.01); *G06F 2212/7201* (2013.01)

(58) Field of Classification Search
CPC ............ G06F 12/1036; G06F 12/1054; G06F 2212/7201
See application file for complete search history.

(56) References Cited

U.S. PATENT DOCUMENTS

| | | | |
|---|---|---|---|
| 8,631,212 B2 | 1/2014 | Kegel et al. | |
| 8,875,295 B2 | 10/2014 | Lutas et al. | |
| 9,424,199 B2 | 8/2016 | Kegel et al. | |
| 9,639,477 B2 | 5/2017 | Gove | |
| 10,048,881 B2 | 8/2018 | Sankaran et al. | |
| 10,489,308 B2 | 11/2019 | Bear et al. | |
| 11,188,638 B2 | 11/2021 | Vidrine et al. | |
| 2006/0004795 A1* | 1/2006 | Shah | G06F 12/1081 |
| 2007/0168641 A1* | 7/2007 | Hummel | G06F 9/45558 |
| | | | 711/206 |
| 2008/0016314 A1* | 1/2008 | Li | H04L 63/1441 |
| | | | 711/E12.091 |
| 2015/0378933 A1* | 12/2015 | Ooba | G06F 3/065 |
| | | | 711/206 |

(Continued)

OTHER PUBLICATIONS

N. Tiwari and N. Hubballi, "Secure Socket Shell Bruteforce Attack Detection With Petri Net Modeling," in IEEE Transactions on Network and Service Management, vol. 20, No. 1, pp. 697-710, Mar. 2023, doi: 10.1109/TNSM.2022.3212591. Date of Publication : Oct. 6, 2022 (Year: 2022).*

(Continued)

*Primary Examiner* — Eric T Oberly
(74) *Attorney, Agent, or Firm* — Kilpatrick Townsend & Stockton LLP

(57) ABSTRACT

An input/output memory management unit (IOMMU) can assign input/output virtual addresses (IOVA) using a predetermined randomness algorithm according to some examples. For instance, the IOMMU can determine an input/output virtual address (IOVA) using the pre-defined randomness algorithm. Then, the IOMMU can store, in a translation table, an entry which maps the IOVA to a physical memory address of a storage device. Subsequent to storing the entry in the translation table the IOMMU can receive a request from an input/output (IO) device, where the request is to access data at the IOVA. In response to receiving the request, the IOMMU can identify the physical memory address that is mapped to the IOVA in the entry. The IOMMU can then allow the IO device to access the data at the physical memory address.

20 Claims, 3 Drawing Sheets

(56) References Cited

U.S. PATENT DOCUMENTS

2017/0286674 A1\* 10/2017 Gathala ............... G06F 12/1009
2019/0073481 A1\* 3/2019 Angelino .................. G06F 8/65
2023/0117751 A1\* 4/2023 Kneckt ................ H04L 1/1614
370/329

OTHER PUBLICATIONS

J. Koschel, C. Giuffrida, H. Bos and K. Razavi, "TagBleed: Breaking KASLR on the Isolated Kernel Address Space using Tagged TLBs," 2020 IEEE European Symposium on Security and Privacy (EuroS&P), Genoa, Italy, 2020, pp. 309-321, doi: 10.1109/EuroSP48549. 2020.00027. (Year: 2020).\*

Kil et al., "Address Space Layout Permutation (ASLP): Towards Fine-Grained Randomization of Commodity Software", https:/ ieeexplore.ieee.org/abstract/document/4041179, 2006; pp. 1-10.

\* cited by examiner

ASSIGNING INPUT/OUTPUT VIRTUAL ADDRESSES USING A PRE-DEFINED RANDOMNESS ALGORITHM

TECHNICAL FIELD

The present disclosure relates generally to input/output memory management units (IOMMUs) of a computer system and, more particularly (although not necessarily exclusively), to an IOMMU that can assign input/output virtual addresses using a pre-defined randomness algorithm, which may help reduce security vulnerabilities.

BACKGROUND

Direct memory access (DMA) allows hardware devices in a computer to access system memory for reading or writing independently of a central processing unit (CPU). Examples of hardware devices that are capable of performing DMA include disk drive controllers, graphics cards, and network cards. While a hardware device is performing the DMA, the CPU can engage in other operations. DMA is especially useful in real-time computing applications where it is critical to avoid interrupting concurrent operations.

A computer having DMA-capable devices often uses an input/output memory management unit (IOMMU) to manage address translations. An IOMMU is a hardware memory management unit (MMU) that resides on the input/output (IO) path connecting the device to the memory. The IOMMU can map an IO virtual address (IOVA) to a physical address of a memory device. Normally, IOVAs are allocated in a sequential order corresponding to the physical memory addresses.

DETAILED DESCRIPTION

In a computer system, a memory management units (MMU) can be positioned between a central processing unit (CPU) and a storage device. The MMU can help facilitate memory operations requested by the CPU. The MMU can also help prevent exploitations of memory corruption vulnerabilities. Input/Output memory management units (IOMMUs) can provide similar functionality for IO devices. For example, an IOMMU can be positioned between IO devices and the storage device to facilitate memory operations. But the protections afforded by IOMMUs may be weaker than those provided by MMUs for a variety of reasons. For example, an IOMMU may assign IOVAs sequentially, which can allow attackers to easily predict target address spaces on the physical memory. And due to the high computational cost of periodically invalidating large numbers of translation entries from a translation table of the IOMMU, IOVAs may remain valid after they are no longer in use. The net effect of these two problems is that an attacker may be able to successfully guess a valid IOVA and take advantage of it for malicious purposes.

Some examples of the present disclosure can overcome one or more of the abovementioned problems by determining the IOVAs using a pre-defined randomness algorithm, which may reduce memory errors or reduce opportunities for malicious attacks. For example, if a malicious attacker attempts to access the storage device by impersonating an IO device, the malicious attacker may have to guess a randomly assigned IOVA in the translation table, which may be extremely difficult.

In some examples, the IOMMU can also check the translation table to determine if a particular IOVA is still in use. If not, the IOMMU may invalidate that IOVA from the translation table. As a result, if an IO device attempts to access the IOVA, the IOMMU will block the IO device from access.

The IOMMU may detect behavior indicative of a malicious attacker. Given that IOVAs may be assigned by a pre-defined randomness algorithm, the IOMMU may have a threshold for sequentially ordered IOVAs. Exceeding the threshold may indicate illegitimate access attempts by a malicious attacker. In the event the threshold is exceeded, the IOMMU may execute certain functions to block the perceived malicious access attempts and future access attempts. For instance, the IOMMU may invalidate sequentially ordered IOVAs beyond the threshold, interrogating an IO device associated with the sequentially ordered IOVAs, or notify an administrator.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
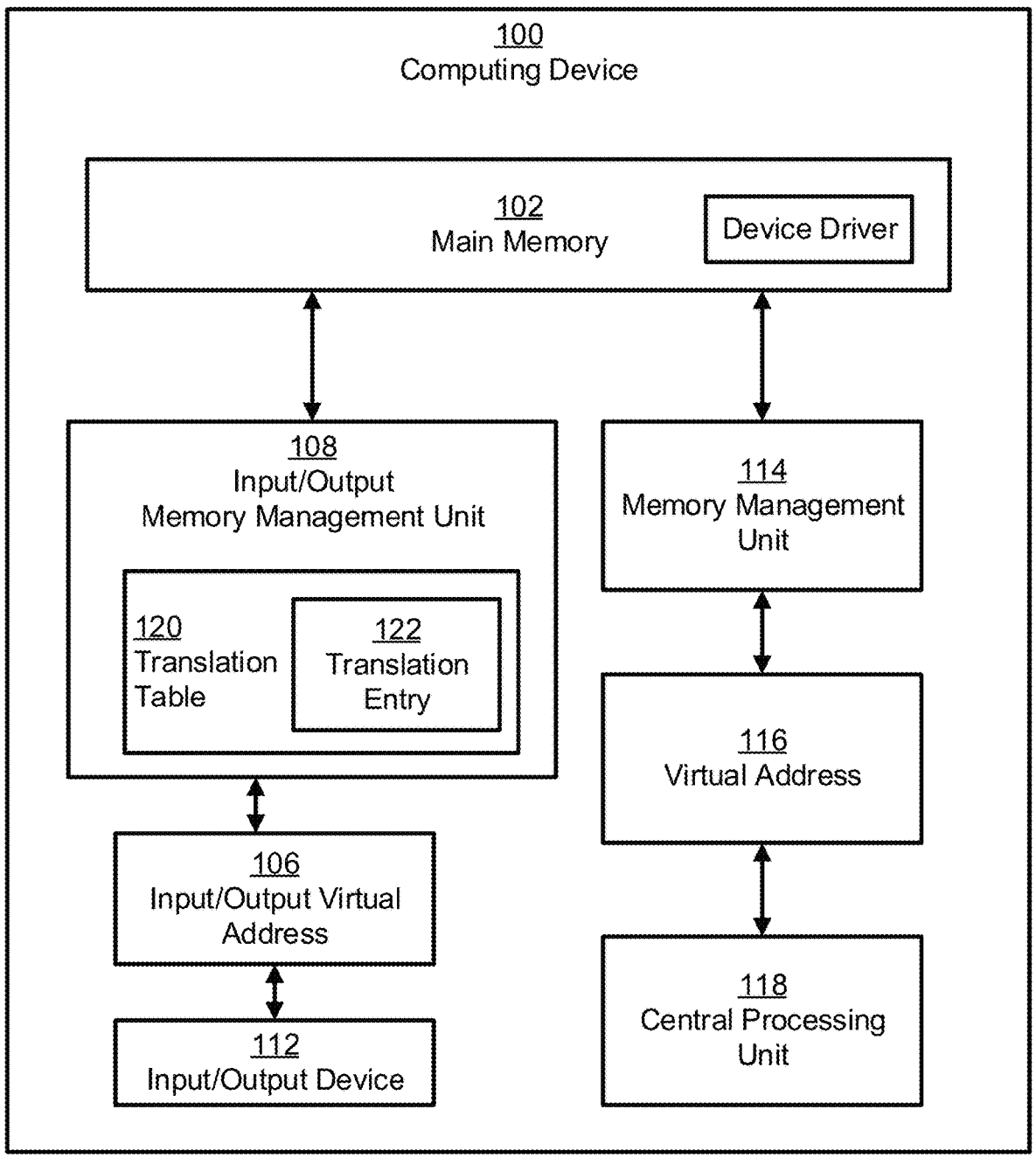
FIG. 1 is a block diagram of an example of a system for assigning input/output virtual addresses (IOVAs) non-sequentially according to some aspects of the present disclosure.

FIG. 1 is a block diagram of an example of a system for assigning input/output virtual addresses (IOVAs) non-sequentially according to some aspects of the present disclosure. The system can include a computing device 100, such as a laptop, desktop, server, tablet, mobile phone, or embedded computing board.

The computing device 100 includes a main memory 102, an input/output (IO) device 112, and a central processing unit (CPU) 118. Examples of the main memory 102 can include a hard drive or hard disk. Examples of the IO device 112 include a graphics card, sound card, network card, wireless network card, video capture card, SATA Expansion card, M.2 NVMe Expansion card, port expansion card, CPU expansion card, RAM expansion card, keyboard, mouse, gamepad, printer, display, touchscreen, or external storage device.

The path between the IO device 112 and the main memory 102 includes an input/output memory management unit (IOMMU) 108. The IOMMU 108 can translate an input/output virtual address (IOVA) 106 to a physical address in the main memory 102. The IOVA 106 may be passed from the IO device 112 to the IOMMU for translation using a translation table 120. This IOVA 106 may be "visible" to the IO device 112, while the physical address may be "hidden" from the IO device 112.

Similarly, the path between the CPU 118 and the main memory 102 includes a memory management unit (MMU)

114. The MMU 114 can translate a virtual address 116 from the CPU 118 to a physical address in the main memory 102. The virtual address 116 may be "visible" to the CPU 118, while the physical address may be "hidden" from the CPU 118.

The IOMMU 108 may determine the IOVA 106 using a predefined randomness algorithm. The predefined randomness algorithm can be configured to generate an IOVA in at least a substantially random manner. The IOMMU 108 can then store the randomized IOVA 106 in a translation entry 122 of the translation table 120. The translation entry 122 can be an entry that maps the IOVA 106 to a corresponding physical memory address in the main memory 102.

After storing the translation entry 122 in the translation table 120, the IOMMU 108 may receive a request from the IO device 112. The request can request to access data at the IOVA 106. In some such examples, the IOVA 106 may be transmitted to the IO device 112 by a device driver, which may be located in the main memory 102 or elsewhere in the system. The device driver may be configured to resolve an alignment restriction, in which the IOVA 106 selected by the IOMMU 108 is a different length of bits than the length of memory address expected by the IO device 112. The device driver may resolve such an alignment restriction by combining bits of the IOVA 106 subjected to the predefined randomness algorithm with padding bits that can extend the IOVA 106, making the IOVA 106 still valid for the IO device 112.

In response to receiving the request, the IOMMU 108 can access the translation table 120, determine a translation entry 122 associated with the IOVA 106 specified in the request, and use the translation entry 122 to identify a physical memory address of the main memory 102 that is mapped to the IOVA 106. The IOMMU 108 may then allow the IO device 112 to access the data at the physical memory address on the main memory 102.

In some examples, the IOMMU 108 may check if the IOVA 106 is still in use after overseeing the request from the IO device 112. In response to determining the IOVA 106 is not in use, the IOMMU 108 may invalidate the translation entry 122 from the translation table 120. This invalidation step may provide added security such that a malicious attacker or a malfunctioning IO device 112 is unable to corrupt entries on the main memory 102 through direct memory access.

Memory coherence issues can occur when multiple processors share the same memory space. For example, the IO device 112 may be a graphics card with a graphics processing unit (GPU). In such an example, the GPU of the IO device 112 may share the main memory 102 with the CPU 118. For the GPU of the IO device 112 to avoid affecting the work of the CPU 118 present on the main memory 102, a schema may be necessary to observe the main memory 102 use of both processing elements, the GPU of the IO device 112 and the CPU 118. As part of such a schema, the IOMMU 108 may examine other physical memory addresses associated with other translation entries apart from the entries of the IO device 112 and assign the translation entry 210 such that memory coherence issues are less likely to occur. In such observations, the IOMMU may also assign the translation entry 210 to avoid bit flip issues, in which the electro-magnetic influence of bits in a physical address of the main memory 102 can cause the bits of an adjacent physical address to change unintentionally.

In some examples, the whole IOVA 106 may be randomized. For example, the IOVA 106 may be a completely randomized string of bits. In other examples, only a subpart of the IOVA 106 may be randomized. For example, the IOMMU 108 may subject less than a total number of addressable bits to the pre-defined randomness algorithm. As one such example, if the IOMMU supports 48-bit IOVAs when allocating a 4-kilobyte range of addresses, 32 bits of the IOVA 106 may be available for randomization. Other bits may include other information, such as read and write permissions, which may not be randomized. By preventing the randomization of some bits, functions such as read and write permissions can be maintained while still offering the security protection and error protection afforded by randomization.

In some examples, the translation table 120 may include a plurality of entries for mapping a plurality of IOVAs to a plurality of physical addresses of the memory 102. In some such examples, the translation table 120 may be specific to the IO device 112. For instance, the IOMMU 108 may store a separate translation table for each IO device, where a given translation table is specific to a given IO device and not used in relation to other IO devices. In other examples, a single translation table may be shared between multiple IO devices. This may help conserve memory if two translation tables would be substantially similar.

Also, the IOMMU 108 may detect behavior indicative of a malicious attacker. For example, the IOMMU 108 may track requests by an IO device 112 having sequentially ordered IOVAs. If the number of requests meets or exceeds a predefined threshold, it may indicate an attacker is attempting to guess a valid IOVA to access the memory 102 or another type of security threat. The IOMMU 108 can detect such a security threat based on the number of such requests meeting or exceeding the predefined threshold and, in response, perform one or more mitigation operations. The mitigation operations can be designed to thwart the attack or otherwise reduce the security risk. Examples of such mitigation operations may include blocking incoming requests for a predetermined period of time or alerting an administrator.

Including an IOMMU 108 in the computing device 100 may be preferable to direct, unmediated physical addressing to the main memory 102 by the IO device 112 for several reasons. The IOMMU 108 can save computational resources that may otherwise be spent finding fragmented, available memory addresses within the main memory 102. In some instances, certain IO devices may not be able to address the full span of available memory addresses within the main memory 102. The IOVA 106 created by the IOMMU 108 can reach any address within the main memory 102, without expending computational resources on techniques such as double buffering to provide physical address extension.

The IOMMU 108 may also serve as a layer of protection against direct memory access attacks or errant memory transfers attempted by the IO device 112. The IOMMU 108 may provide this layer protection by not allowing the IO device 112 to read or write to an address of the main memory 102 that has not been explicitly allocated with an IOVA 106.

In some examples, the IO device 112 may be a graphics card. In some such examples, the IOMMU 108 may be a graphics address remapping table (GART). The IOMMU 108 may load graphical data, such as textures and polygon meshes, from the main memory 102 to the IO device 112. Textures and polygon meshes may have initially been loaded to the main memory 102 by the central processing unit 118. The main memory 102 may buffer the textures and polygon meshes between the IO device 112 and any number of original data sources, such as a hard drive, a solid-state drive, a network card, etc.

Figure 2:
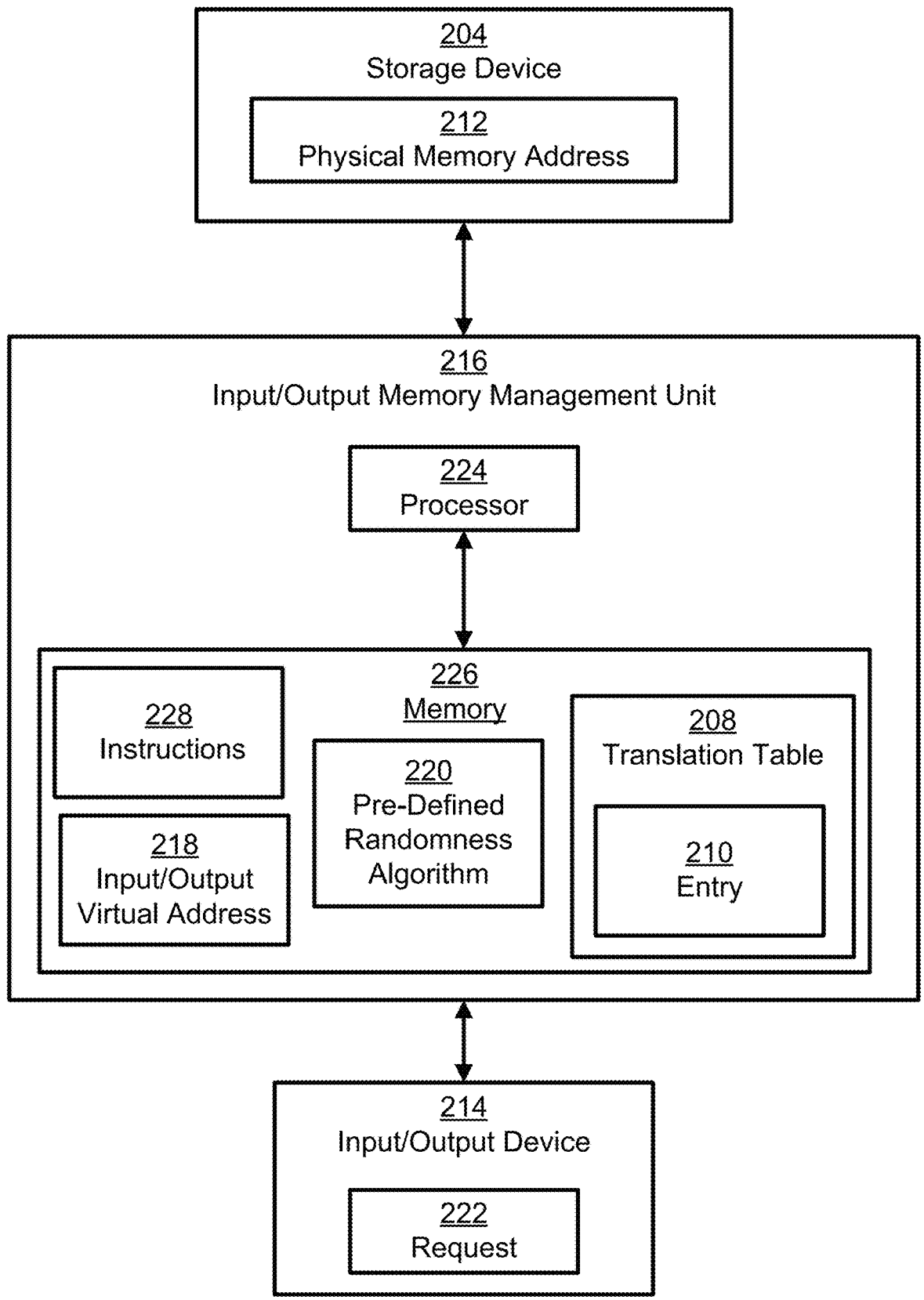
FIG. 2 is a block diagram of an example of a system for assigning input/output virtual addresses to physical memory addresses using a pre-defined randomness algorithm according to some aspects of the present disclosure.

FIG. 2 is a block diagram of an example of a system for assigning input/output virtual addresses to physical memory addresses using a pre-defined randomness algorithm according to some aspects of the present disclosure. The system includes an IOMMU 216. The IOMMU 216 includes a processor 224 and a memory 226 including instructions 228. The IOMMU 216 is positioned in a pathway between an input/output (IO) device 214 and a storage device 204. The storage device 204 includes physical memory addresses, such as physical memory address 212. Non-limiting examples of the storage device 204 include electrically erasable and programmable read-only memory (EEPROM), flash memory, or any other type of non-volatile memory.

The processor 224 can include one processing device or multiple processing devices. Non-limiting examples of the processor 224 include a Field-Programmable Gate Array (FPGA), an application-specific integrated circuit (ASIC), or a microprocessor. The processor 224 can execute instructions 228 stored in the memory 226 to perform operations. In some examples, the instructions 228 can include processor-specific instructions generated by a compiler or an interpreter from code written in a suitable computer-programming language, such as C, C++, C #, etc.

The memory 226 can include one memory device or multiple memory devices. The memory 226 can be non-volatile and may include any type of memory that retains stored information when powered off. Non-limiting examples of the memory 226 include electrically erasable and programmable read-only memory (EEPROM), flash memory, or any other type of non-volatile memory. At least some of the memory 226 can include a non-transitory computer-readable medium from which the processor 224 can read instructions 228. A computer-readable medium can include electronic, optical, magnetic, or other storage devices capable of providing the processor 224 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer process or can read the instructions 228.

In some examples, the processor 224 of the IOMMU 216 can determine an input/output virtual address (IOVA) 218 using a pre-defined randomness algorithm 220. The processor 224 can then store, in a translation table 208, an entry 210 that maps the IOVA to a physical memory address 212 of a storage device 204. Subsequent to storing the entry 210 in the translation table 208, the processor 224 can receive a request 222 from an input/output (IO) device 214. The request 222 can be to access data at the IOVA 218. In response to receiving the request 222, the processor 224 can identify the physical memory address 212 that is mapped to the IOVA 218 in the entry 210. The processor 224 can then allow the IO device 214 to access the data at the physical memory address 212.

Figure 3:
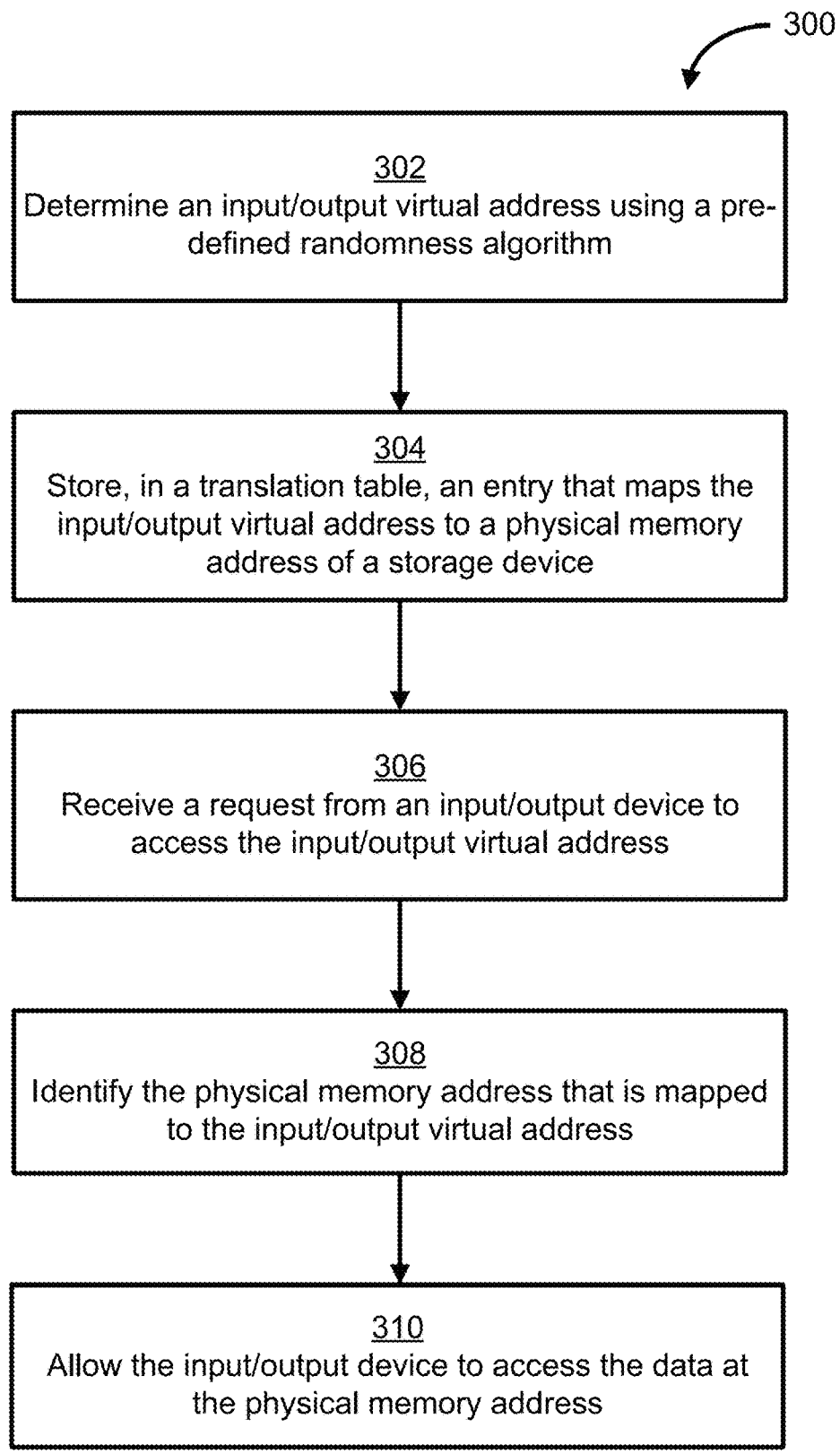
FIG. 3 is a flowchart of an example of a process for assigning input/output virtual addresses using a pre-defined randomness algorithm according to some aspects of the present disclosure.

FIG. 3 is a flowchart of an example of a process 300 for assigning input/output virtual addresses using a pre-defined randomness algorithm according to some aspects of the present disclosure. Some examples may include more steps, fewer steps, different steps, or a different combination of steps than is shown in FIG. 3. The steps of FIG. 3 are described below with reference to the components of FIG. 2 described above.

In block 302, the IOMMU 216 may determine an IOVA 218 using a pre-defined randomness algorithm 220. Examples of the pre-defined randomness algorithm 220 may be a linear congruential generator, a generator related to linear-feedback shift registers, a Mersenne Twister random number generator, a shift-register generator, a well equi-distributed long-period linear pseudorandom number generator, or any other suitable pre-defined randomness algorithm. The IOMMU may alter which bits are randomized or exclude results from the pre-defined randomness algorithm 220 based on entries in the translation table 208.

Security afforded by the pre-defined randomness algorithm 220 may depend on the breadth of IOVAs that may result from the pre-defined randomness algorithm. This breadth of possible IOVAs may be increased by maximizing entropy in the pre-defined randomness algorithm 220. Entropy may be increased either by raising the amount of IOVA area space over which the pre-defined randomness occurs or reducing the time period over which the pre-defined randomness occurs.

In block 304, the IOMMU 216 may store, in the translation table 208, a translation entry 210 that maps the IOVA 218 to a physical memory address 212 of the storage device 204. The translation table 208 may be dedicated to the IO device 214 or may be shared by several IO devices. In some examples, there may be multiple IOVAs, including said IOVA 218, mapped to the same physical memory address 212.

In block 306, subsequent to storing the translation entry 210 to the translation table 208, the IOMMU may receive a request 222 from the IO device 214 for the IO device 214 to access data at the IOVA 218. In some examples, the IOMMU may evaluate such requests in case they are indicative of a security threat. For example, the IOMMU may be able to detect a predefined number of access requests that correspond to sequential IOVAs. In some such examples, requesting sequential IOVAs may indicate a malicious attacker that is operating under the assumption that the IOMMU 216 is conventionally assigning IOVAs in a sequential order. Because the IOMMU 216 assigns IOVAs non-sequentially by a pre-defined randomness algorithm 220, repeated attempts at requesting sequential IOVAs can be assumed to be a sign of a malicious attacker.

In block 308, in response to receiving the request 222, the IOMMU 216 may identify the physical memory address 212 that is mapped to the IOVA 218 by the translation entry 210. In some examples, the translation entry 210 may correspond to a range of physical memory addresses.

In block 310 the IOMMU 216 may allow the IO device 214 to access the data at the physical memory address 212. Accessing the data may involve reading or writing data to the physical memory address 212. In some examples, the IOVA 218 may be transmitted to the IOMMU 216 by a device driver.

After the IOMMU 216 allows the IO device 214 to access the data at the physical memory address 212, the IOMMU may inspect the translation entry 210 associated with the IOVA 218. If the IOVA 218 associated with the translation entry 210 is no longer in use, the IOMMU 216 may invalidate the translation entry 210. By invalidating the translation entry 210, the IOMMU 216 may block access to the storage device 204, from the IO device 214, by way of the IOVA 218. This blocked access may prevent the IO device 214 from creating a memory corruption error. This may be beneficial because direct memory access could allow the IO device 214 to affect not only operations related to itself, but also effect any operations staged on the storage device 204, such as an operating system.

Invalidating the translation entry 210 may also prevent a cascade of memory corruption errors. For example, the IO device 214 may be instructed to fill multiple addresses sequentially. With a conventional approach, the IOMMU 216 may create the IOVA 218 for the request 222 which provides access to the physical memory address 212. Subsequent access requests may then, through subsequent, sequentially ordered IOVAs, fill a plurality of sequentially ordered physical memory addresses. If, under the conventional approach, the IOMMU 216 has created an initial memory corruption error by accessing a physical memory address under use, subsequent, sequentially ordered physical memory addresses which may be functionally related to the initial physical memory address may also experience memory corruption errors.

The IOMMU 216 and its pre-defined randomness algorithm 220 may differ from techniques such as address-space layout randomization because the IOMMU 216 may not randomize memory regions such as stacks, heaps, or libraries. And in some examples, the IOMMU 216 may apply the pre-defined randomness algorithm 220 to generate every IOVA. By subjecting every IOVA to the pre-defined randomness algorithm 220, malicious techniques such as heap spraying may be useless to an attacker.

For example, in an application of address-space layout randomization, the location of a stack may be randomly assigned within storage device 204, but the addresses comprising the stack may be reused. A heap spray attack may change the contents of these reused addresses to reveal which addresses are associated with a process targeted by the malicious attacker. With every IOVA randomized and routinely invalidated, there may be no pattern of reused addresses or collection of sequential addresses for the malicious attacker to discover.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

What is claimed is:

1. A method comprising:
    generating, by an input/output memory management unit (IOMMU), an input/output virtual address (IOVA) that includes a string of bits, wherein generating the IOVA involves randomizing one or more of the bits using a pre-defined randomness algorithm;
    storing, by the IOMMU in a translation table, an entry that maps the IOVA to a physical memory address of a storage device; and
    subsequent to storing the entry in the translation table:
        receiving, by the IOMMU, a request from an input/output (IO) device, wherein the request is to access data at the IOVA;
        in response to receiving the request, identifying, by the IOMMU, the physical memory address that is mapped to the IOVA in the entry; and
        allowing, by the IOMMU, the IO device to access the data at the physical memory address.

2. The method of claim 1, wherein the translation table includes a plurality of entries for mapping a plurality of IOVAs to a plurality of physical addresses of the storage device, and wherein the translation table is specific to the IO device.

3. The method of claim 1, wherein the translation table is shared between a first input/output (I/O) device and a second I/O device.

4. The method of claim 1, wherein the IOMMU subjects less than a total number of bits in the string of bits to the pre-defined randomness algorithm, such that the IOVA includes at least one unrandomized bit, and wherein the at least one unrandomized bit corresponds to read or write permissions.

5. The method of claim 1, further comprising detecting a security threat in response to receiving at least a predefined number of access requests with sequential IOVAs.

6. The method of claim 1, wherein the IOVA is transmitted to the IO device from the IOMMU by a device driver.

7. The method of claim 1, wherein the pre-defined randomness algorithm includes a linear congruential generator, a Mersenne Twister random number generator, a shift-register generator, or a well equi-distributed long-period linear pseudorandom number generator.

8. The method of claim 1, further comprising:
    altering, by the IOMMU, which bits are randomized in at least one IOVA based on at least one entry in the translation table.

9. A non-transitory computer-readable medium comprising program code that is executable by a processor of an input/output memory management unit (IOMMU) for causing the IOMMU to:
    generate an input/output virtual address (IOVA) that includes a string of bits, wherein generating the IOVA involves randomizing one or more of the bits using a pre-defined randomness algorithm;
    store, in a translation table, an entry that maps the IOVA to a physical memory address of a storage device; and
    subsequent to storing the entry in the translation table:
        receive a request from an input/output (IO) device, wherein the request is to access data at the IOVA;
        in response to receiving the request, identify the physical memory address that is mapped to the IOVA in the entry; and
        allow the IO device to access the data at the physical memory address.

10. The non-transitory computer-readable medium of claim 9, wherein the translation table includes a plurality of entries for mapping a plurality of IOVAs to a plurality of physical addresses of the storage device, and wherein the translation table is specific to the IO device.

11. The non-transitory computer-readable medium of claim 9, wherein the translation table is shared between a first input/output (I/O) device and a second I/O device.

12. The non-transitory computer-readable medium of claim 9, wherein a subset of the string of bits is predesignated for randomization, wherein only the subset is randomized using the pre-defined randomness algorithm, such that a remainder of the bits in the string of bits remain unrandomized, and wherein one or more of the unrandomized bits dictate read and write permissions.

13. The non-transitory computer-readable medium of claim 9, further comprising program code that is executable by the processor for causing the IOMMU to:
    detect a security threat in response to receiving at least a predefined number of access requests with sequential IOVAs.

14. The non-transitory computer-readable medium of claim 9, further comprising program code that is executable by the processor for causing the IOMMU to:
    transmit the IOVA to a device driver associated with the IO device, wherein the device driver is configured to forward the IOVA to the IO device for subsequent use.

15. A system comprising:
a processor of an input/output memory management unit (IOMMU); and
a memory device of the IOMMU, the memory device including instructions executable by the processor for causing the IOMMU to:
  generate an input/output virtual address (IOVA) that includes a string of numbers, wherein generating the IOVA involves randomizing one or more of the numbers using a pre-defined randomness algorithm;
  store, in a translation table of the IOMMU, an entry that maps the IOVA to a physical memory address of a storage device; and
  subsequent to storing the entry in the translation table:
    receive a request from an input/output (IO) device, wherein the request is to access data at the IOVA;
    in response to receiving the request, identify the physical memory address that is mapped to the IOVA in the entry; and
    allow the IO device to access the data at the physical memory address.

16. The system of claim 15, further comprising instructions executable by the processor for causing the processor to:
  determine, by the IOMMU, whether the entry related to the IOVA is still in use; and
  in response to determining that the IOVA is not in use, invalidate the entry in the translation table.

17. The system of claim 16, wherein the translation table includes a plurality of entries for mapping a plurality of IOVAs to a plurality of physical addresses of the storage device, and wherein the translation table is specific to the IO device.

18. The system of claim 15, wherein the translation table is shared between a first input/output (I/O) device and a second I/O device.

19. The system of claim 15, wherein a subset of the string of numbers is predesignated for randomization, wherein only the subset is randomized using the pre-defined randomness algorithm, such that a remainder of the numbers in the string of numbers remain unrandomized, and wherein at least one of the unrandomized numbers corresponds to a read permission or a write permission.

20. The system of claim 15, further comprising instructions executable by the processor for causing the processor to detect a security threat in response to receiving at least a predefined number of access requests with sequential IOVAs.

* * * * *